US010042751B1

(12) United States Patent
Veprinsky et al.

(10) Patent No.: US 10,042,751 B1
(45) Date of Patent: Aug. 7, 2018

(54) METHOD AND SYSTEM FOR MULTI-TIER ALL-FLASH ARRAY

(71) Applicant: EMC IP Holding Company LLC, Hopkinton, MA (US)

(72) Inventors: Alexandr Veprinsky, Brookline, MA (US); Assaf Natanzon, Tel Aviv (IL); Saar Cohen, Moshav (IL); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 98 days.

(21) Appl. No.: 14/871,344

(22) Filed: Sep. 30, 2015

(51) Int. Cl.
G06F 12/02 (2006.01)
G06F 13/28 (2006.01)

(52) U.S. Cl.
CPC ............ G06F 12/023 (2013.01); G06F 13/28 (2013.01); G06F 2212/251 (2013.01)

(58) Field of Classification Search
None
See application file for complete search history.

(56) References Cited

U.S. PATENT DOCUMENTS

| 6,667,700 | B1* | 12/2003 | McCanne | H03M 7/30 341/50 |
|---|---|---|---|---|
| 7,203,741 | B2 | 4/2007 | Marco et al. | |
| 7,719,443 | B1 | 5/2010 | Natanzon | |
| 7,840,536 | B1 | 11/2010 | Ahal et al. | |
| 7,840,662 | B1 | 11/2010 | Natanzon | |
| 7,844,856 | B1 | 11/2010 | Ahal et al. | |
| 7,860,836 | B1 | 12/2010 | Natanzon et al. | |
| 7,882,286 | B1 | 2/2011 | Natanzon et al. | |
| 7,934,262 | B1 | 4/2011 | Natanzon et al. | |
| 7,958,372 | B1 | 6/2011 | Natanzon | |
| 8,037,162 | B2 | 10/2011 | Marco et al. | |
| 8,041,940 | B1 | 10/2011 | Natanzon et al. | |
| 8,060,713 | B1 | 11/2011 | Natanzon | |
| 8,060,714 | B1 | 11/2011 | Natanzon | |
| 8,103,937 | B1 | 1/2012 | Natanzon et al. | |
| 8,108,634 | B1 | 1/2012 | Natanzon et al. | |
| 8,214,612 | B1 | 7/2012 | Natanzon | |

(Continued)

OTHER PUBLICATIONS

Yoon et al. "The Dynamic granularity memory System" (Year: 2012).*

Primary Examiner — Tracy Chan
(74) Attorney, Agent, or Firm — Daly, Crowley, Mofford & Durkee, LLP

(57) ABSTRACT

Example embodiments of the present invention relate to a method, a system, and a computer program product for tiering metadata. The method includes selecting a consecutive range of addresses of a logical device having a parent data structure associated therewith maintaining a first set of hash values at a first granularity of the logical device. A second hash value then may be calculated over the consecutive range of addresses of the logical device at a second granularity of the logical device and inserted into a child data structure associated with the parent data structure. Entries in the parent data structure at the first granularity for the consecutive range of addresses then may be freed in favor of the second hash value at the second granularity for the consecutive range of addresses inserted into the child data structure, for storing hash values for other addresses of the logical device.

21 Claims, 14 Drawing Sheets

(56) References Cited

U.S. PATENT DOCUMENTS

| | | |
|---|---|---|
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |

(56) References Cited

U.S. PATENT DOCUMENTS

| | | |
|---|---|---|
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 2010/0005270 A1* | 1/2010 | Jiang .................... G06F 3/0608 711/206 |
| 2010/0199036 A1* | 8/2010 | Siewert ................ G06F 3/0613 711/112 |
| 2012/0072656 A1* | 3/2012 | Archak ............ G06F 17/30132 711/104 |
| 2014/0229656 A1* | 8/2014 | Goss .................. G06F 12/0246 711/103 |
| 2015/0058583 A1* | 2/2015 | Baldwin .............. G06F 3/0641 711/162 |
| 2016/0239219 A1* | 8/2016 | Lotem .................. G06F 3/0611 |

\* cited by examiner

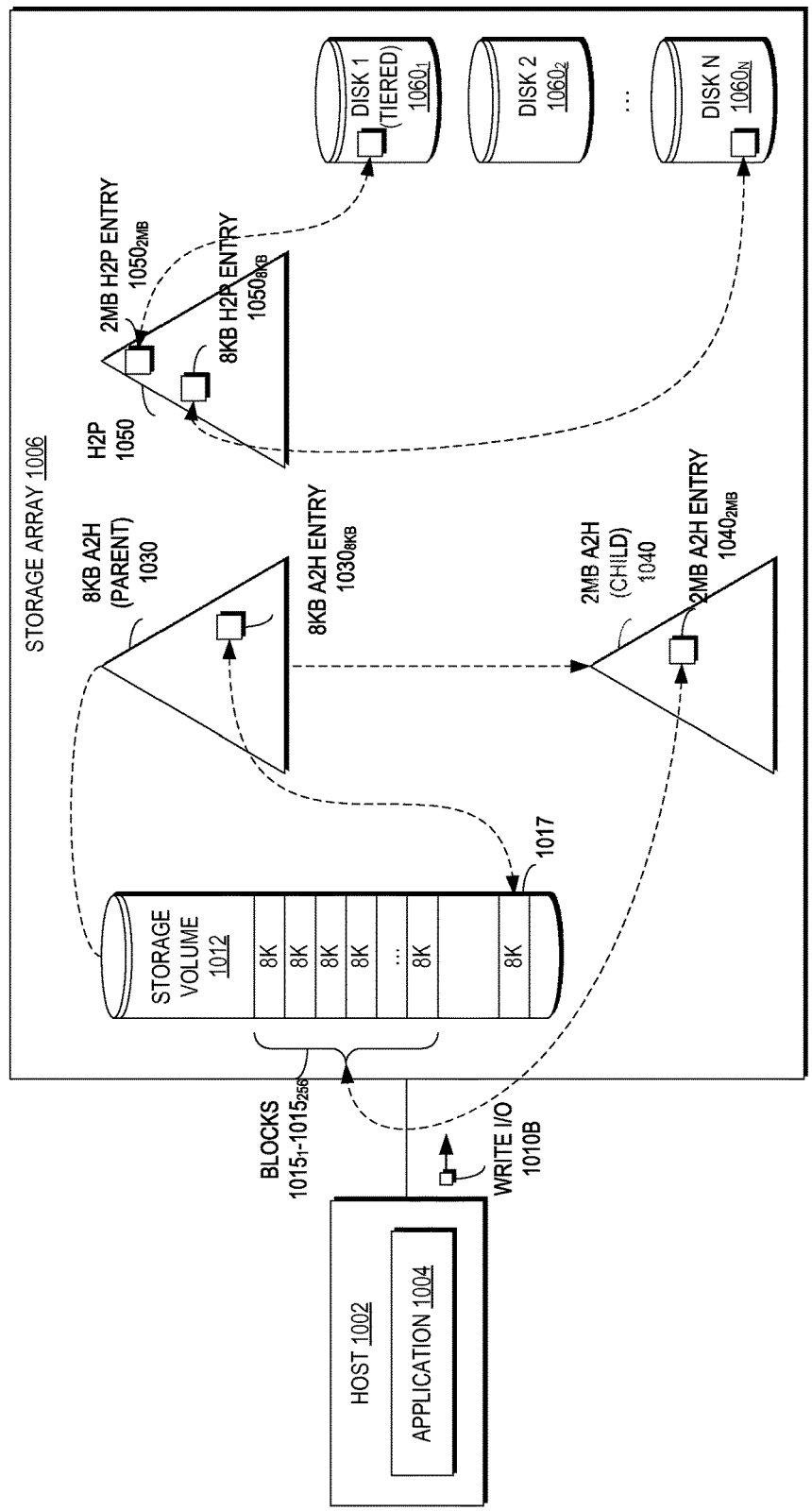
FIG. 10B (WRITE I/O)

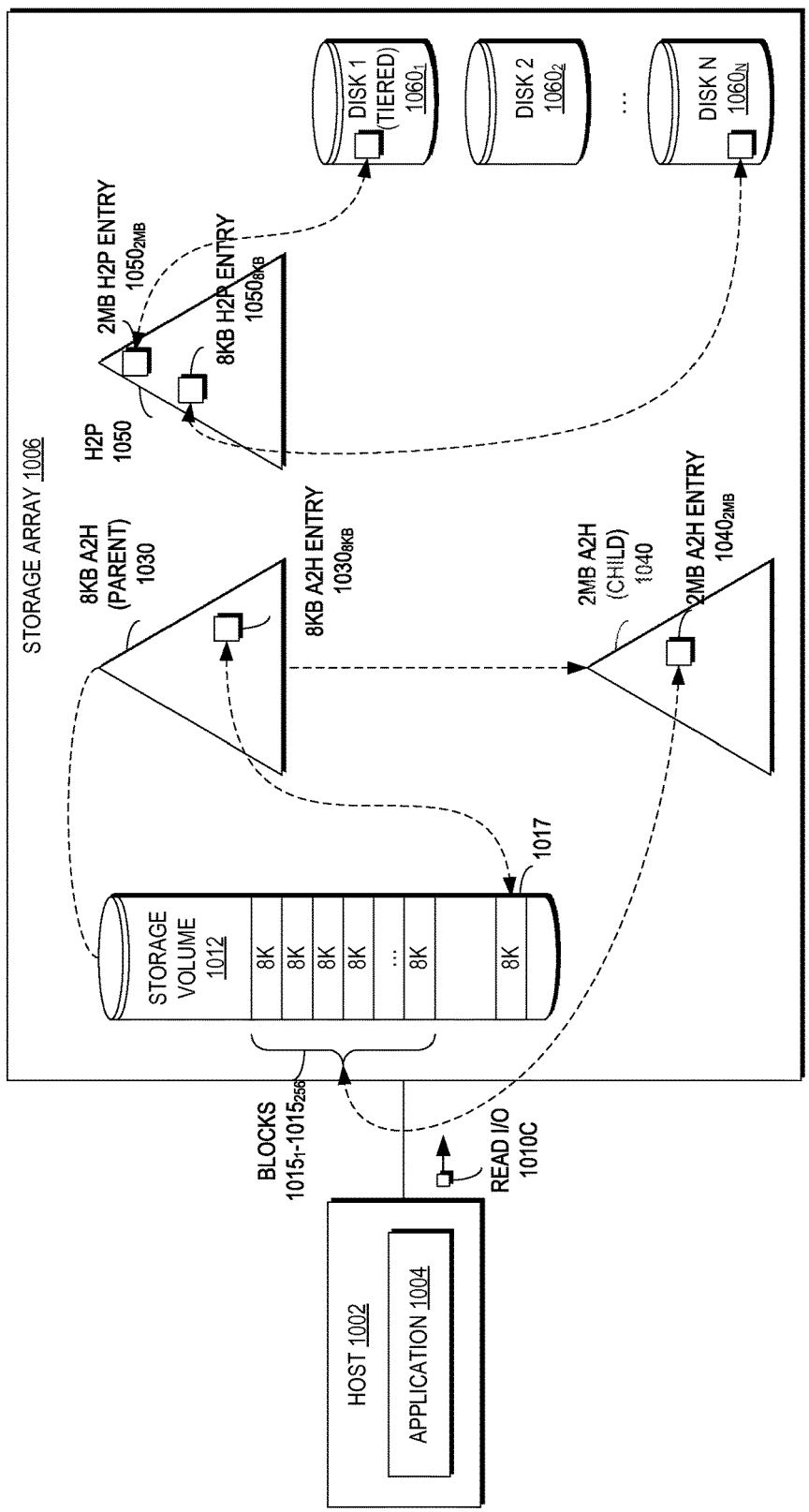
FIG. 10C (READ I/O)

METHOD AND SYSTEM FOR MULTI-TIER ALL-FLASH ARRAY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

Storage systems in general, and block based storage systems specifically, are a key element in modern data centers and computing infrastructure. These systems are designed to store and retrieve large amounts of data, by providing data block address and data block content—for storing a block of data—and by providing a data block address for retrieval of the data block content that is stored at the specified address.

Storage solutions are typically partitioned into categories based on a use case and application within a computing infrastructure, and a key distinction exists between primary storage solutions and archiving storage solutions. Primary storage is typically used as the main storage pool for computing applications during application run-time. As such, the performance of primary storage systems is very often a key challenge and a major potential bottleneck in overall application performance, since storage and retrieval of data consumes time and delays the completion of application processing. Storage systems designed for archiving applications are much less sensitive to performance constraints, as they are not part of the run-time application processing.

In general computer systems grow over their lifetime and the data under management tends to grow over the system lifetime. Growth can be exponential, and in both primary and archiving storage systems, exponential capacity growth typical in modern computing environment presents a major challenge as it results in increased cost, space, and power consumption of the storage systems required to support ever increasing amounts of information.

Existing storage solutions, and especially primary storage solutions, rely on address-based mapping of data, as well as address-based functionality of the storage system's internal algorithms. This is only natural since the computing applications always rely on address-based mapping and identification of data they store and retrieve. However, a completely different scheme in which data, internally within the storage system, is mapped and managed based on its content instead of its address has many substantial advantages. For example, it improves storage capacity efficiency since any duplicate block data will only occupy actual capacity of a single instance of that block. As another example, it improves performance since duplicate block writes do not need to be executed internally in the storage system. Existing storage systems, either primary storage systems or archiving storage systems are incapable of supporting the combination of content based storage—with its numerous advantages—and ultra-high performance. This is a result of the fact that the implementation of content based storage scheme faces several challenges:

(a) intensive computational load which is not easily distributable or breakable into smaller tasks, (b) an inherent need to break large blocks into smaller block sizes in order to achieve content addressing at fine granularity. This block fragmentation dramatically degrades the performance of existing storage solutions, (c) inability to maintain sequential location of data blocks within the storage systems, since mapping is not address based any more, and such inability causes dramatic performance degradation with traditional spinning disk systems, (d) the algorithmic and architectural difficulty in distributing the tasks associated with content based mapping over a large number of processing and storage elements while maintaining single content-addressing space over the full capacity range of the storage system.

A number of issues arise with respect to such devices, and it is necessary to consider such issues as performance, lifetime and resilience to failure of individual devices, overall speed of response and the like.

Such devices may be used in highly demanding circumstances where failure to process data correctly can be extremely serious, or where large scales are involved, and where the system has to be able to cope with sudden surges in demand.

SUMMARY

Example embodiments of the present invention relate to a method, a system, and a computer program product for tiering metadata. The method includes selecting a consecutive range of addresses of a logical device having a parent data structure associated therewith maintaining a first set of hash values at a first granularity of the logical device. A second hash value then may be calculated over the consecutive range of addresses of the logical device at a second granularity of the logical device and inserted into a child data structure associated with the parent data structure. Entries in the parent data structure at the first granularity for the consecutive range of addresses then may be freed in favor of the second hash value at the second granularity for the consecutive range of addresses inserted into the child data structure, for storing hash values for other addresses of the logical device.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 10B is a block diagram illustrating performing a write I/O in a tiered storage array according to an example embodiment of the present invention;

FIG. 10C is a block diagram illustrating performing a read I/O in a tiered storage array according to an example embodiment of the present invention;

DETAILED DESCRIPTION

Figure 1:
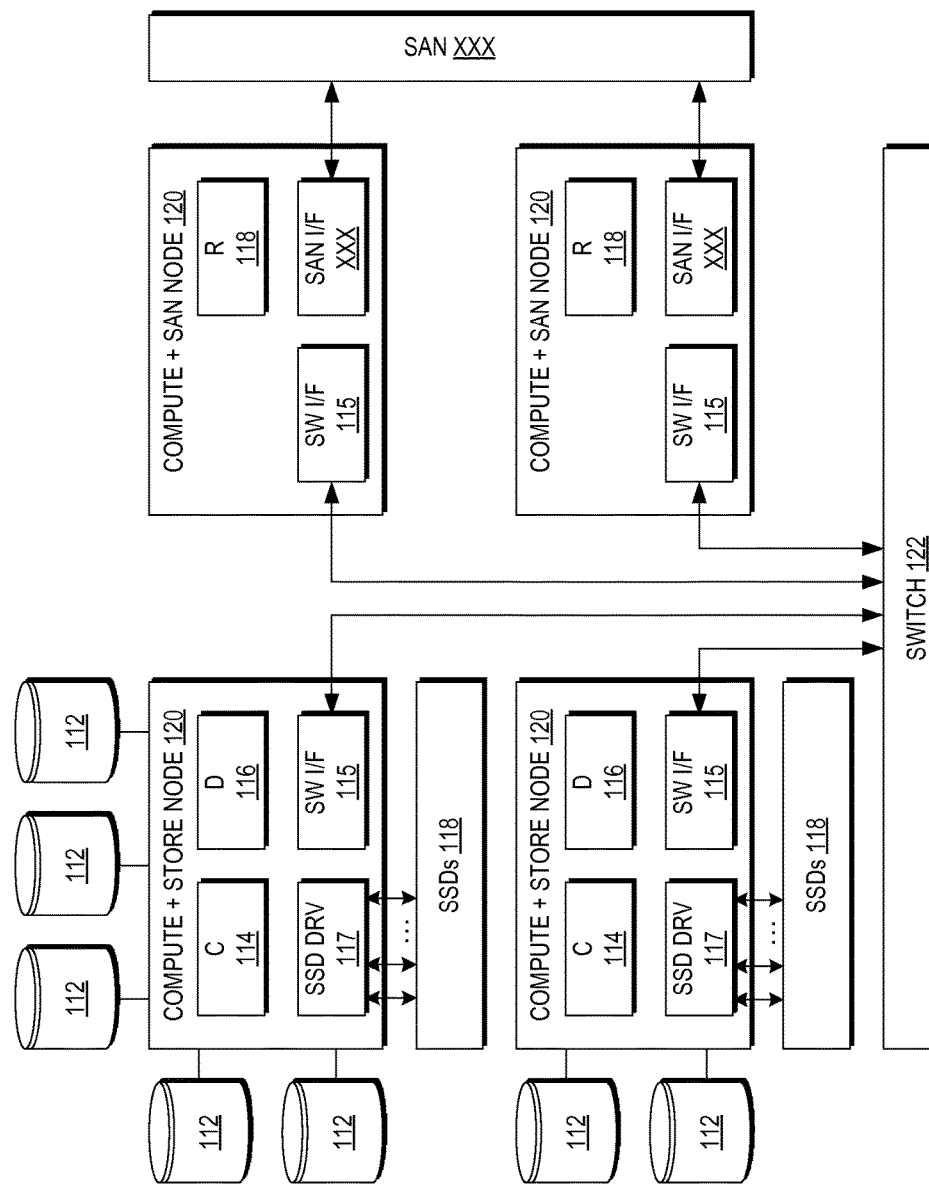
FIG. 1 is a simplified diagram schematically illustrating a system for data storage, having separate control and data planes.

In a Content Addressable Storage (CAS) array, data is stored in blocks, for example of 4 KB, where each block has a unique large hash signature, for example of 20 bytes, saved on Flash memory. The examples described herein include a networked memory system. The networked memory system includes multiple memory storage units arranged for content addressable storage of data. The data is transferred to and from the storage units using separate data and control planes. Hashing is used for the content addressing, and the hashing produces evenly distributed results over the allowed input range. The hashing defines the physical addresses so that data storage makes even use of the system resources.

A relatively small granularity may be used, for example with a page size of 4 KB, although smaller or larger block sizes may be selected at the discretion of the skilled person. This enables the device to detach the incoming user access pattern from the internal access pattern. That is to say the incoming user access pattern may be larger than the 4 KB or other system-determined page size and may thus be converted to a plurality of write operations within the system, each one separately hashed and separately stored.

Content addressable data storage can be used to ensure that data appearing twice is stored at the same location. Hence, unnecessary duplicate write operations can be identified and avoided. Such a feature may be included in the present system as data deduplication. As well as making the system more efficient overall, it also increases the lifetime of those storage units that are limited by the number of write/erase operations.

The separation of Control and Data may enable a substantially unlimited level of scalability because control operations can be split over any number of processing elements and data operations can be split over any number of data storage elements. This allows scalability in both capacity and performance, and may thus permit an operation to be effectively balanced between the different modules and nodes.

The separation may also help to speed the operation of the system. That is to say it may speed up Writes and Reads. Such may be due to:

(a) Parallel operation of certain Control and Data actions over multiple Nodes/Modules; and (b) Use of optimal internal communication/networking technologies per the type of operation (Control or Data), designed to minimize the latency (delay) and maximize the throughput of each type of operation.

Also, separation of control and data paths may allow each Control or Data information unit to travel within the system between Nodes or Modules in the optimal way, meaning only to where it is needed and if/when it is needed. The set of optimal where and when coordinates is not the same for control and data units, and hence the separation of paths ensures the optimization of such data and control movements, in a way which is not otherwise possible. The separation is important in keeping the workloads and internal communications at the minimum necessary, and may translate into increased optimization of performance.

De-duplication of data, meaning ensuring that the same data is not stored twice in different places, is an inherent effect of using Content-Based mapping of data to D-Modules and within D-Modules.

Scalability is inherent to the architecture. Nothing in the architecture limits the number of the different R, C, D, and H modules which are described further herein. Hence any number of such modules can be assembled. The more modules added, the higher the performance of the system becomes and the larger the capacity it can handle. Hence scalability of performance and capacity is achieved.

The principles and operation of an apparatus and method according to the present invention may be better understood with reference to the drawings and accompanying description.

Reference is now made to FIG. 1 which illustrates a system 10 for scalable block data storage and retrieval using content addressing. The system 10 includes data storage devices 112 on which the data blocks are stored. The storage devices 112 are networked to computing modules, there being several kinds of modules, including control modules 114 and data modules 116. The modules carry out content addressing for storage and retrieval, and the network defines separate paths or planes, control paths or a control plane which goes via the control modules 114 and data paths or a data plane which goes via the data modules 116.

The control modules 114 may control execution of read and write commands. The data modules 116 are connected to the storage devices and, under control of a respective control module, pass data to or from the storage devices. Both the C and D modules may retain extracts of the data stored in the storage device, and the extracts may be used for the content addressing. Typically the extracts may be computed by cryptographic hashing of the data, as will be discussed in greater detail below, and hash modules (FIG. 2) may specifically be provided for this purpose. That is to say the hash modules calculate hash values for data which is the subject of storage commands, and the hash values calculated may later be used for retrieval.

Routing modules 118 may terminate storage and retrieval operations and distribute command parts of any operations to control modules that are explicitly selected for the operation in such a way as to retain balanced usage within the system 10.

The routing modules may use hash values, calculated from data associated with the operations, to select the control module for the distribution. More particularly, selection of the control module may use hash values, but typically relies on the user address and not on the content (hash). The hash value is, however, typically used for selecting the Data (D) module, and for setting the physical location for data storage within a D module.

The storage devices may be solid state random access storage devices, as opposed to spinning disk devices; however disk devices may be used instead or in addition.

A deduplication feature may be provided. The routing modules and/or data modules may compare the extracts or hash values of write data with hash values of already stored data, and where a match is found, simply point to the matched data and avoid rewriting.

The modules are combined into nodes 120 on the network, and the nodes are connected over the network by a switch 122.

The use of content addressing with multiple data modules selected on the basis of the content hashing, and a finely-grained mapping of user addresses to Control Modules allow for a scalable distributed architecture.

A glossary is now given of terms used in the following description:

X-PAGE—A predetermined-size aligned chunk as the base unit for memory and disk operations. Throughout the present description the X-Page size is referred to as having 4 KB, however other smaller or larger values can be used as well and nothing in the design is limited to a specific value.

LUN or LOGICAL UNIT NUMBER is a common name in the industry for designating a volume of data, or a group of data blocks being named with the LUN. Each data block is referred to, by the external user of the storage system, according to its LUN, and its address within this LUN LOGICAL X-PAGE ADDRESS—Logical address of an X-Page. The address contains a LUN identifier as well as the offset of the X-Page within the LUN.

LOGICAL BLOCK—512 bytes (sector) aligned chunk, which is the SCSI base unit for disk operations.

LOGICAL BLOCK ADDRESS—Logical address of a Logical Block. The logical block address contains a LUN identifier as well as the offset of the logical block within the LUN.

SUB-LUN—Division of a LUN to smaller logical areas, to balance the load between C modules. Each such small logical area is called a sub-LUN.

SUB-LUN UNIT SIZE—The fixed size of a sub-LUN.

X-Page Data—Specific sequence of user data values that resides in an X-Page. Each such X-Page Data is uniquely represented in the system by its hash digest.

D PRIMARY—The D module responsible for storing an X-Page's Data

D BACKUP—The D module responsible for storing a backup for an X-Page Data. The backup is stored in a non-volatile way (NVRAM or UPS protected).

ACRONYMS:
LXA—Logical X-Page Address.
LB—Logical Block.
LBA—Logical Block Address.
AUS—Atomic Unit Size.
SL—Sub-LUN.
SLUS—Sub-LUN Unit Size.
MBE—Management Back End.

The examples described herein relate to a block-level storage system, offering basic and advanced storage functionality. The design may be based on a distributed architecture, where computational, Storage Area Networking (SAN), and storage elements are distributed over multiple physical Nodes, with all such Nodes being inter-connected over an internal network through a switch device. The distributed architecture enables the scaling of the system's capabilities in multiple aspects, including overall storage capacity, performance characteristics in bandwidth and I/O operations per second (IOPS), computational resources, internal and external networking bandwidth, and other. While being based on a distributed architecture, the system presents, externally, a unified storage system entity with scalable capabilities.

The system's architecture and internal algorithms implementing the basic and advanced storage functions are optimized for improved utilization of the capabilities of random-access memory/storage media, as opposed to contrast with mechanical-magnetic spinning disk storage media. The optimizations are implemented in the design itself, and may, for example, include the ability to break incoming writes into smaller blocks and distribute the operation over different Nodes. Such an adaptation is particularly suitable for random access memory/storage media but is less suitable in a spinning-disk environment, as it would degrade performance to extremely low levels. The adaptation includes the content/hash based mapping of data distributes the data over different D Nodes in general and within D Nodes over different SSD devices. Again, such a scheme is more suitable for random access memory/storage media than for a spinning-disk media because such spread of data blocks would result in very poor performance in the spinning disk case. That is to say, the described elements of the present architecture are designed to work well with random access media, and achieve benefits in performance, scalability, and functionality such as inline deduplication. Such random-access memory media can be based on any or a combination of flash memory, DRAM, phase change memory, or other memory technology, whether persistent or non-persistent, and is typically characterized by random seek/access times and random read/write speeds substantially higher than those exhibited by spinning disk media. The system's internal data block mapping, the algorithms implementing advanced storage functions, and the algorithms for protecting data stored in the system are designed to provide storage performance and advanced storage functionality at substantially higher performance, speed, and flexibility than those available with alternative storage systems.

Data mapping within the system is designed not only to improve performance, but also to improve the life span and reliability of the electronic memory media, in cases where the memory technology used has limitations on write/erase cycles, as is the case with flash memory. Lifetime maximization may be achieved by avoiding unnecessary write operations as will be explained in greater detail below. For the purpose of further performance optimization, life span maximization, and cost optimization, the system may employ more than a single type of memory technology, including a mix of more than one Flash technology (e.g., single level cell—SLC flash and multilevel cell—MLC flash), and a mix of Flash and DRAM technologies. The data mapping optimizes performance and life span by taking advantage of the different access speeds and different write/erase cycle limitations of the various memory technologies.

The core method for mapping blocks of data internally within the system is based on Content Addressing, and is implemented through a distributed Content Addressable Storage (CAS) algorithm.

This scheme maps blocks of data internally according to their content, resulting in mapping of identical block to the same unique internal location. The distributed CAS algorithm allows for scaling of the CAS domain as overall system capacity grows, effectively utilizing and balancing the available computational and storage elements in order to improve overall system performance at any scale and with any number of computational and storage elements.

The system supports advanced In-line block level deduplication, which may improve performance and save capacity.

Elements of the system's functionality are: Write (store) data block at a specified user address; Trim data block at a specified user address; Read data block from a specified user address; and In-line block level deduplication.

The following features may be provided: (1) A distributed CAS based storage optimized for electronic random-access storage media; The optimization includes utilizing storage algorithms, mainly the content-based uniformly-distributed mapping of data, that inherently spread data in a random way across all storage devices. Such randomization of storage locations within the system while maintaining a very high level of performance is preferably achievable with storage media with a high random access speed; (2) A distributed storage architecture with separate control and data planes; Data mapping that maximizes write-endurance of storage media; System scalability; (3) System resiliency to fault and/or failure of any of its components; (4) Use of multi-technology media to maximize write-endurance of storage media; and (5) In-line deduplication in ultrahigh performance storage using electronic random-access storage media.

The examples described herein implement block storage in a distributed and scalable architecture, efficiently aggregating performance from a large number of ultra-fast storage media elements (SSDs or other), preferably with no performance bottlenecks, while providing in-line, highly granular block-level deduplication with no or little performance degradation.

One challenge is to avoid performance bottlenecks and allow performance scalability that is independent of user data access patterns.

The examples described herein may overcome the scalability challenge by providing data flow (Write, Read) that is distributed among an arbitrary and scalable number of physical and logical nodes. The distribution is implemented by (a) separating the control and data paths (the "C" and "D" modules), (b) maintaining optimal load balancing between all Data modules, based on the content of the blocks (through the CAS/hashing mechanisms), hence ensuring always balanced load sharing regardless of user access patterns, (c) maintaining optimal load balancing between all Control modules, based on the user address of the blocks at fine granularity, hence ensuring always balanced load sharing regardless of user access patterns, and (d) performing all internal data path operations using small granularity block size, hence detaching the incoming user access pattern from the internal access pattern, since the user pattern is generally larger than the block size.

A second challenge is to support inline, highly granular block level deduplication without degrading storage (read/write speed) performance. The result should be scalable in both capacity—which is deduplicated over the full capacity space—and performance.

The solution involves distributing computation-intensive tasks, such as calculating cryptographic hash values, among an arbitrary number of nodes. In addition, CAS metadata and its access may be distributed among an arbitrary number of nodes. Furthermore, data flow algorithms may partition read/write operations in an optimally-balanced way, over an arbitrary and scalable number of Nodes, while guaranteeing consistency and inline deduplication effect over the complete storage space.

In detaching the data from the incoming pattern, the R-Module breaks up any incoming block which is larger than the granularity size across sub-LUNs, sending the relevant parts to the appropriate C-Modules. Each C-module is predefined to handle a range or set of Sub-LUN logical addresses. The C-Module breaks up the block it receives for distribution to D-Modules, at a pre-determined granularity, which is the granularity for which a Hash is now calculated. Hence the end result is that a request to write a certain block (for example of size 64 KB) ends up being broken up into for example 16 internal writes, each write comprising a 4 KB block.

The specific numbers for granularity can be set based on various design tradeoffs, and the specific number used herein of 4 KB is merely an example. The broken down blocks are then distributed to the D modules in accordance with the corresponding hash values.

A further challenge is to address flash-based SSD write/erase cycle limitations, in which the devices have a lifetime dependent on the number of write/erase cycles.

The solution may involve Inline deduplication to avoid writing in all cases of duplicate data blocks. Secondly, content (hash) based mapping to different data modules and SSDs results in optimal wear-leveling, ensuring equal spread of write operations to all data modules and SSDs independently of the user data/address access patterns.

In the following a system is considered from a functional point of view. As described above with respect to FIG. 1, the system 10 is architected around four main functional Modules designated R (for Router), C (for Control), D (for Data), and H (for Hash). Being modular and scalable, any specific system configuration includes at least one of R, C, D, and H, but may include a multiplicity of any or all of these Modules.

Figure 2:
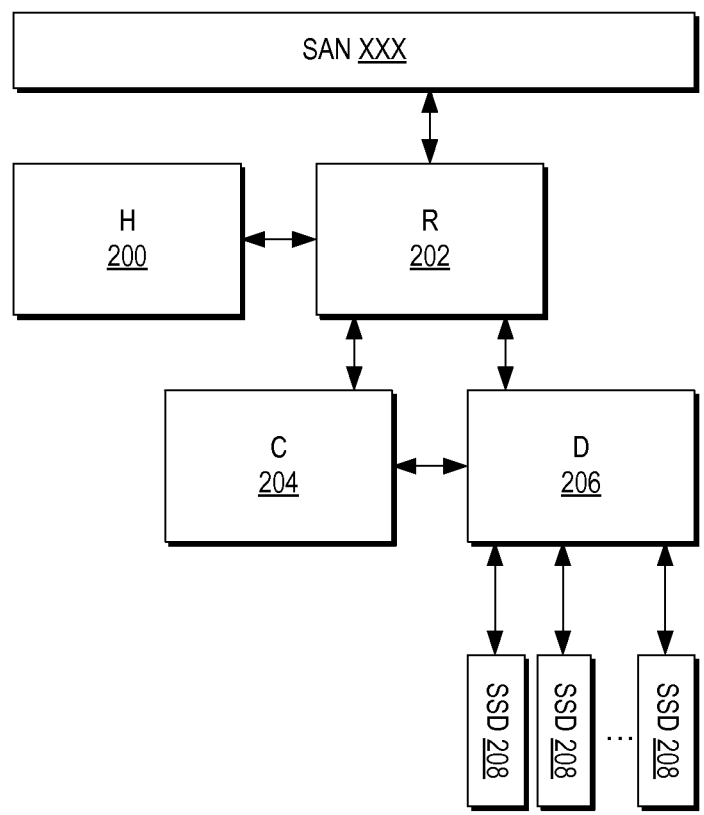
FIG. 2 shows an exemplary configuration of modules for the system of FIG. 1.

Reference is now made to FIG. 2, which is a functional block diagram of the system in which an H module 200 is connected to an R module 202. The R module is connected to both Control 204 and data 206 modules. The data module is connected to any number of memory devices SSD 208.

A function of the R Module 202 is to terminate SAN Read/Write commands and route them to appropriate C and D Modules for execution by these Modules. By doing so, the R Module can distribute workload over multiple C and D Modules, and at the same time create complete separation of the Control and Data planes, that is to say provide separate control and data paths.

A function of the C Module 204 is to control the execution of a Read/Write command, as well as other storage functions implemented by the system. It may maintain and manage key metadata elements.

A function of the D Module 206 is to perform the actual Read/Write operation by accessing the storage devices 208 (designated SSDs) attached to it. The D module 206 may maintain metadata related with the physical location of data blocks.

A function of the H Module is to calculate the Hash function value for a given block of data.

Figure 3:
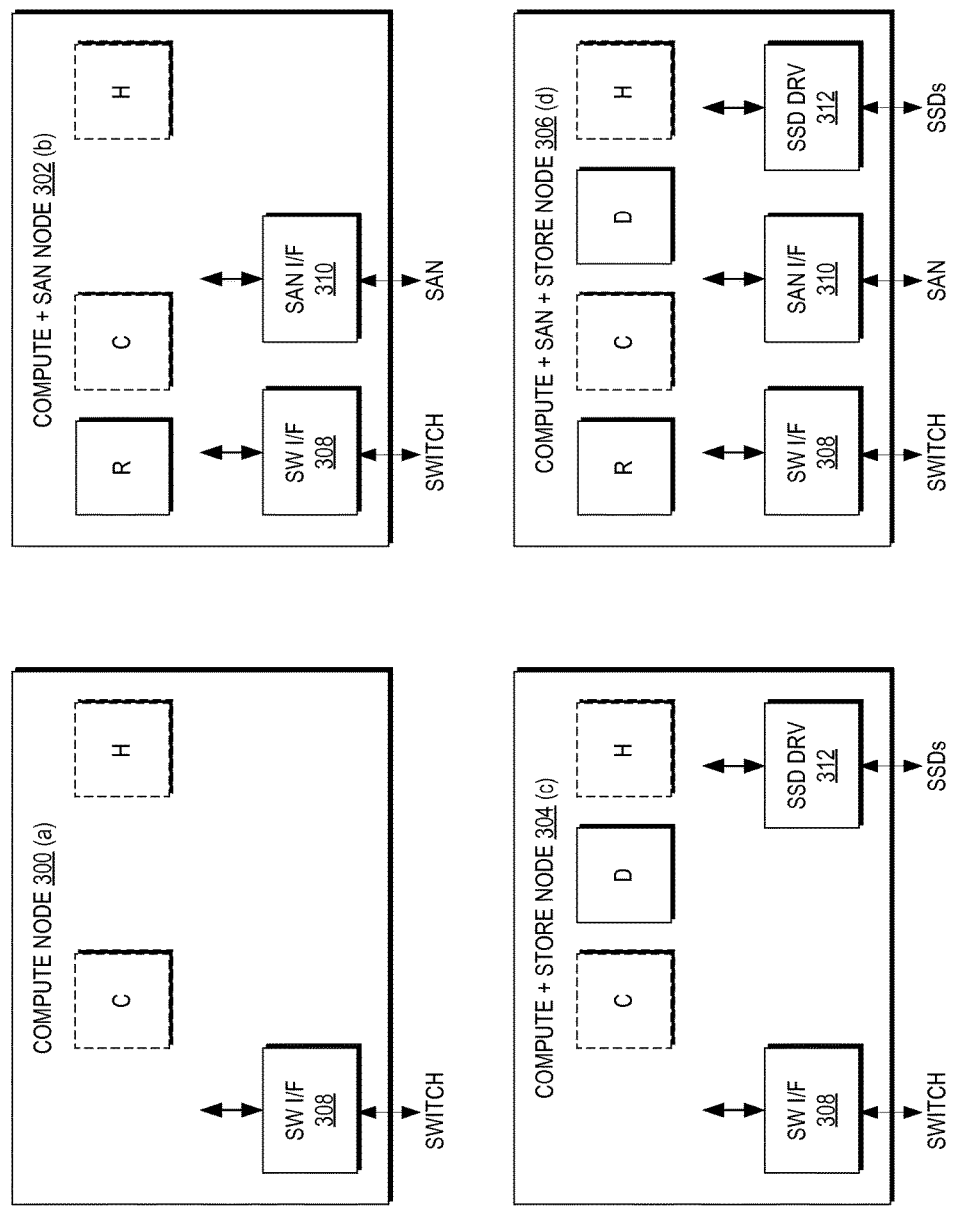
FIG. 3 is a simplified diagram schematically illustrating four different node configurations for the system.

Reference is now made to FIG. 3, which illustrates nodes. The R, C, D, and H Modules may be implemented in software, and executed on a physical Node. A system includes at least one physical Node, and may include multiple Nodes. There are four possible Node configurations: Compute Node 300, which includes control and hash modules, Compute+SAN Node 302 which includes a router as well as control and hash modules, Compute+Store Node 306, which includes a data module in addition to compute and hash modules, and a Compute+SAN+Store Node 306, which includes all four modules. A system includes a storage area networking or SAN function within at least one Node, and a Store function within at least one Node. The SAN function and the store function can be supported by the same physical Node or any combination of multiple Nodes.

In FIG. 3 each node type shows the functional Modules that execute, in at least one copy, within the Node, and functional Modules that may optionally execute within this Node. Optional Modules are shown in dashed line.

All Nodes include a switch interface 308, to allow interconnecting with a switch in a multi-Node system configuration. A Node that contains a SAN function includes at least one SAN Interface module 310 and at least one R Module. A Node that contains a Store function includes at least one SSD Driver Module 312 and at least one D Module. Hence, Compute+SAN and Compute+SAN+STORE Nodes contain a SAN Interface, to interface with the external SAN. The interface may typically use a SCSI-based protocol running on any of a number of interfaces including Fiber Channel, Ethernet, and others, through which Read/Write and other storage function commands are being sent to the system. Compute+Store and Compute+SAN+Store Nodes contain an SSD driver 312 to interface with SSDs 208 attached to that specific Node, where data is stored and accessed.

Figure 4:
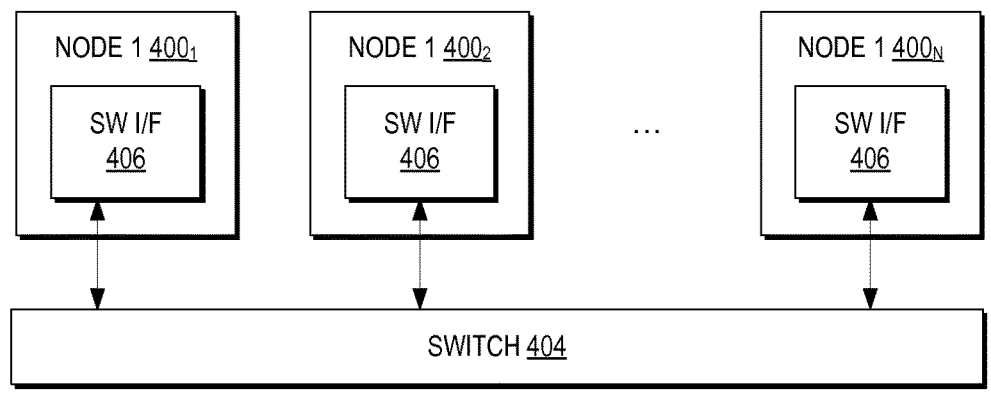
FIG. 4 is a simplified schematic diagram showing the nodes of FIG. 3 connected to a switch.

Reference is now made to FIG. 4, which shows a high level system block diagram. A system implementation includes one or more Nodes $400_1$, $400_2$. In all cases where a system contains more than two Nodes, all physical Nodes are interconnected by a switch 404 which may be based on any of a number of networking technologies including Ethernet, InfiniBand and so forth. In the specific case of a 2-Node system, the two Nodes can be interconnected directly without a need for a switch.

The interconnections between each Node and the Switch may include redundancy, so as to achieve high system availability with no single point of failure. In such a case, each Node may contain two or more Switch Interface modules 406, and the Switch may contain two or more ports per physical Node.

Figure 5:
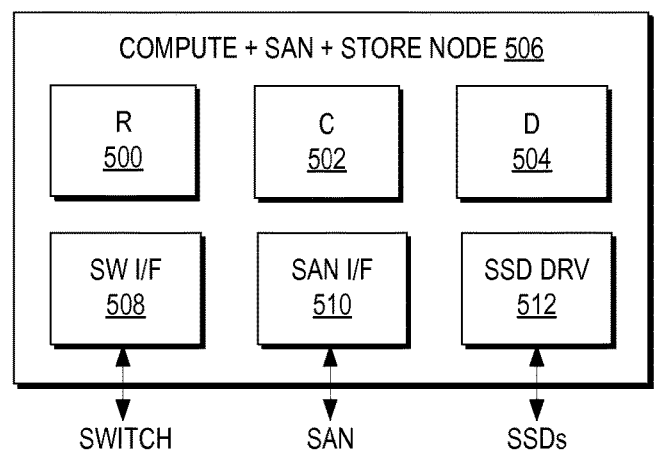
FIG. 5 is a simplified diagram showing a compute+SAN+store node for the device of FIG. 1.

As an example FIG. 5 illustrates a single Node system configuration, in which R, C and D modules, 500, 502 and 504 respectively are together in a compute+SAN+Store node 506. A switch interface 508 links to a switch. A SAN interface 510 provides an interface for storage area networking. An SSD driver 512 interfaces with the storage devices.

A four node system configuration is shown in FIG. 1 above. The configuration includes two compute and store nodes and two compute+SAN nodes.

A system that is built from multiple physical Nodes can inherently support a high availability construction, where there is no single point of failure. This means that any Node or sub-Node failure can be compensated for by redundant Nodes, having a complete copy of the system's meta-data, and a complete redundant copy of stored data (or parity information allowing recovery of stored data). The distributed and flexible architecture allows for seamless support of failure conditions by simply directing actions to alternate Nodes.

The R module is responsible for: routing SCSI I/O requests to the C modules, guarantee execution and return the result; and balancing the work load between the C modules for the requests it is routing.

An A→C table indicates which C module is responsible for each logical X-page address (LXA). Each C module is responsible for a list of Sub LUNs (SLs).

The R module receives requests for I/Os from the SAN INTERFACE routes them to the designated C modules and returns the result to the SAN INTERFACE.

If an I/O operation spans across multiple SLs, and perhaps multiple C modules, then the R module has the responsibility of breaking the big I/O operation into multiple smaller independent operations according to the sub LUN unit size (SLUS). Since the atomic unit size (AUS) is never larger than the SLUS, as explained in greater detail below, each such I/O is treated as an independent operation throughout the system. The results may then be aggregated before returning to the SAN INTERFACE.

The R module is responsible for maintaining an up-to-date A→C table coordinated with the MBE. The A→C table is expected to balance the range of all possible LXAs between the available C modules.

For write operations, the R module instructs the calculation of the hash digest for each X-Page by requesting such calculation from a Hash calculation module.

The C module is responsible for: receiving an I/O request from an R module on a certain SL, guaranteeing its atomic execution and returning the result; communicating with D modules to execute the I/O requests; monitoring the disk content of its SLs' logical space by associating each LXA with its hash digest; and balancing the work load between the D modules for the SLs it is maintaining.

An H2D table maps each range of hash digests to the corresponding D module responsible for this range.

An A2H table maps each LXA that belongs to the SLs C is responsible for, to the hash digest representing the X-Page Data that currently resides in this address.

The C module receives I/O requests from R modules, distributes the work to the D modules, aggregates the results and guarantees an atomic operation. The result is returned to the R module.

The C module maintains an up-to-date H2D table coordinated with the MBE. The table is expected to balance the range of all possible hash digests between the available D modules.

The C module maintains an A2H table in a persistent way. The C module may initiate 110 requests to D modules in order to save table pages to disk, and read them from disk. To avoid frequent disk operations, a Journal of the latest table operations may be maintained.

Data is balanced between the C modules based on the logical address, at the granularity of sub-LUNs.

The D module is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules, perform them and returning a result.

The D module is also responsible for, for each write operation, backing up the X-Page Data in the designated D backup module and performing read-modify operations for writes that are smaller than X-Page size (This process also involves computing a hash digest for these X-Pages).

The D module is further responsible for maintaining an up-to-date H→(D, $D_{backup}$) table coordinated with the MBE. The H→(D, $D_{backup}$) table is expected to balance the range of all possible hash digests between the available D modules.

The D module does not communicate directly with R modules. The only interaction with R modules involves RDMA read/write operations of X-Page Data.

Balancing between the D modules is based on hashing of the content.

The D module makes use of a hash digest metadata table. The hash digest metadata table maps each in use hash digest, that represents actual X-Page Data, to its meta data information including its physical page on the storage media (SSD), its memory copy (if exists), a mapping to any backup memory copy and a reference count for the purpose of deduplication.

A further structure used is the H→(D, $D_{backup}$) table. The H→(D, $D_{backup}$) table maps each range of hash digests to the corresponding D module responsible for the range as well as the $D_{backup}$ module responsible for the range.

The D modules allocate a physical page for each X-Page. The D modules also manage the memory for the physical storage. They allocate memory pages for read/write operations and perform background destaging from memory to storage media when necessary, for example, when running low on memory.

The D modules manage a separate nonvolatile memory pool (NVRAM or UPS protected) for X-Page Data backup purposes. The backup holds X-Pages that are held in memory of the D primary and have not yet been destaged. When re-balancing between D modules occur (due to a D module failure for example), the D module may communicate with other D modules in order to create new backup copies or move a primary ownership as required.

The D modules allow deduplication per X-Page Data by maintaining a persistent reference count that guarantees only one copy per X-Page Data. The D modules manage the hash digest metadata table in a persistent way. The table is coordinated with the physical layout for physical pages allocation, with the memory pointer, memory backup pointer and deduplication reference count.

The D modules receive I/O requests from C modules, perform the requests while supporting deduplication and return the result. The D modules may perform RDMA read/write operations on memory that resides in other modules, such as R modules as mentioned above, as part of the I/O operation.

When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

The H-Module calculates the Hash function of a given block of data, effectively mapping an input value to a unique output value. The Hash function may be based on standards based hash functions such as SHA-1 and MD5, or based on a proprietary function. The hash function is selected to generate a uniformly distributed output over the range of potential input values.

The H modules usually share nodes with an R module but more generally, the H modules can reside in certain nodes, in all nodes, together with R modules, or together with C or D modules.

The following discussion provides high level I/O flows for read, write and trim.

Throughout these flows, unless noted otherwise, control commands are passed between modules using standard RPC messaging, while data "pull" operations may use RDMA read. Data push (as well as Journal) operations may use RDMA write.

The read flow of one X-Page may consist of one R module which receives the read request from the application, one C module in charge of the address requested and one D module which holds the X-Page to be read. Larger, or unaligned, requests may span several X-Pages and thus may involve several D modules. These requests may also span several SLs, in which case they may involve several C modules as well.

Figure 6:
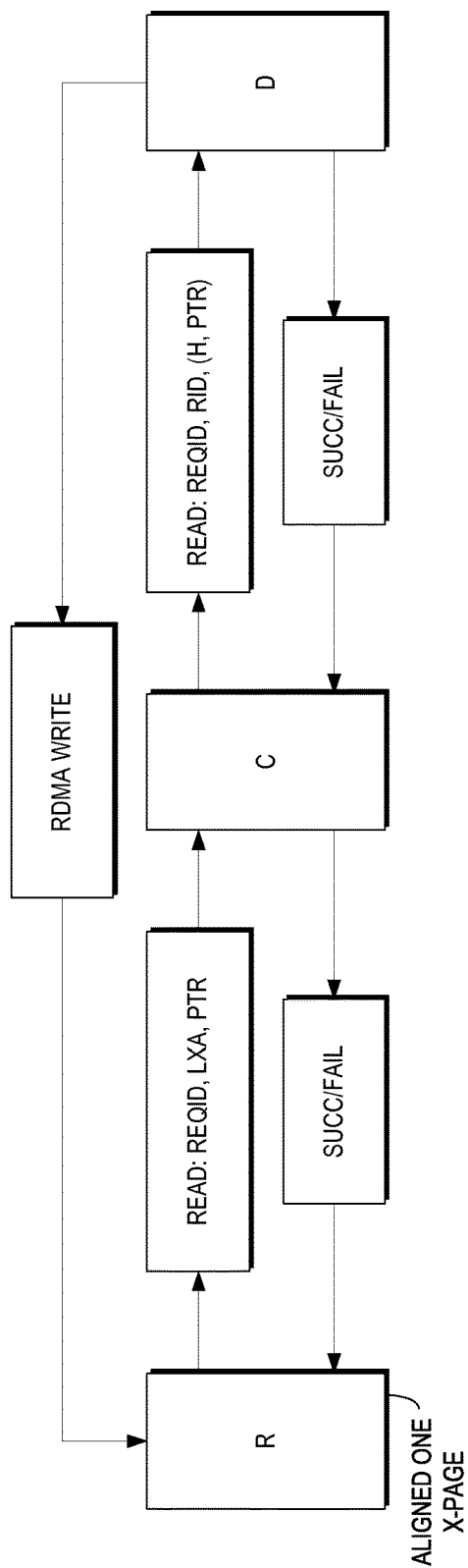
FIG. 6 is a simplified flow chart which illustrates the flow for a read operation for one aligned X-page.

Reference is now made to FIG. 6 which illustrates the flow for a read operation for one aligned X-page. When the R module receives a read request from an application the R module allocates a request ID for the operation; translates the LBA to LXA; allocates a buffer for the data to be read; consults the A→C component to determine which C module is in charge of this LXA; and sends the designated C module a read request which includes parameters that include a request ID; an LXA; and a pointer to the allocated buffer.

The C module, when receiving the request, consults the A2H component, from which it obtains a hash digest representing the X-Page to be read; consults the H2D component to determine which D module holds the X-Page in question; and sends this D module a read request which includes parameters that include a request ID (as received from the R module), the hash digest, a pointer to the buffer to read to, as received from the R module; and an identifier of the R module.

The D module, when receiving the request, reads the data of the requested X-Page from SSD and performs an RDMA write to the requesting R module, specifically to the pointer passed to it by the C module.

Finally the D module returns success or error to the requesting C module.

The C module in turn propagates success or error back to the requesting R module, which may then propagate it further to answer the application.

Figure 7:
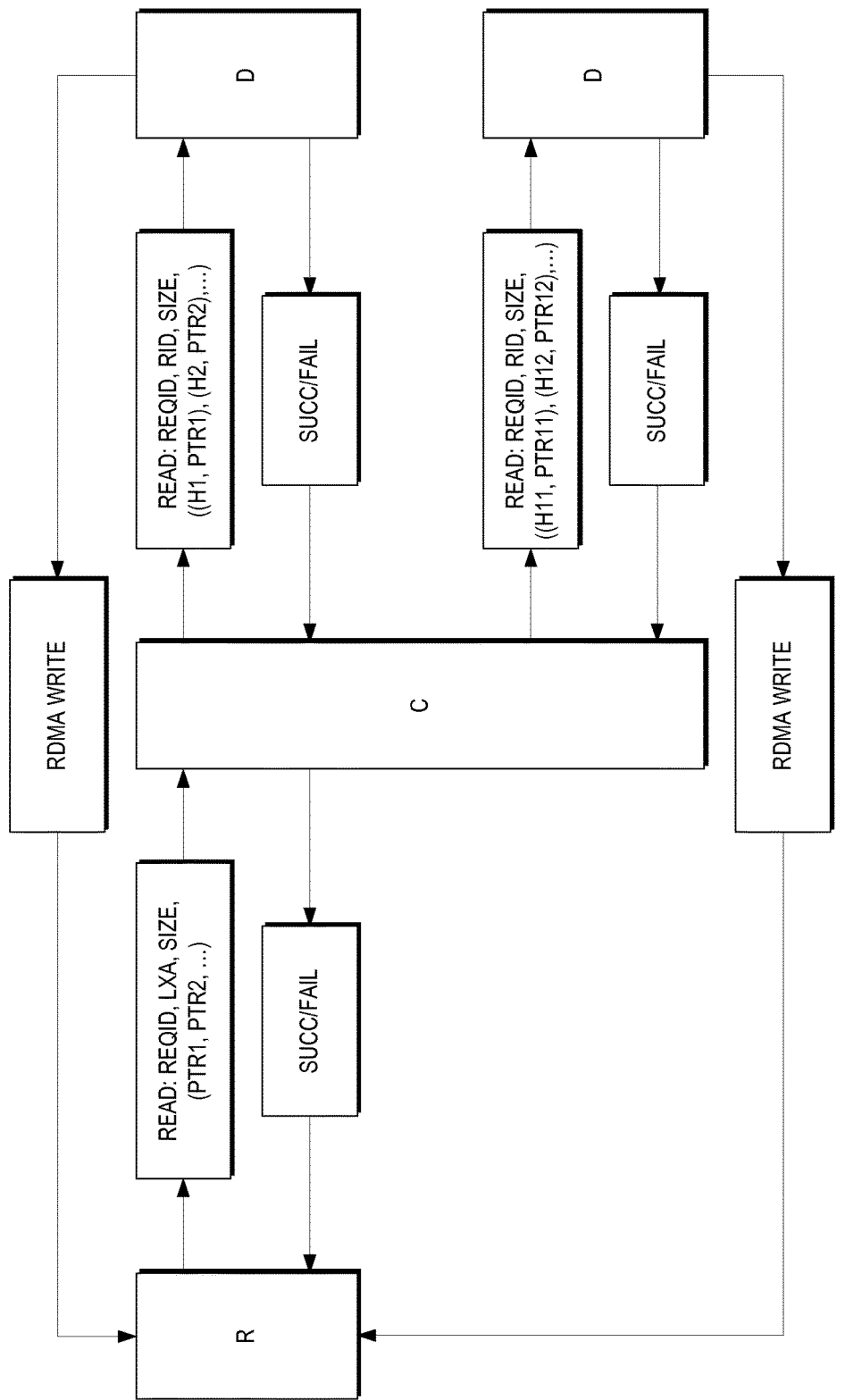
FIG. 7 is a simplified flow chart which illustrates the flow in the event that a read request arrives for a range of addresses spanning more than one X-Page but only one SL.

Reference is now made to FIG. 7, which illustrates the flow in the case that a read request arrives for a range of addresses spanning more than one X-Page but only one SL. In such a case the R module sends the designated C module a read command with the parameters that include a request ID, first LXA, size of the requested read in X-Pages-n, and n pointers to the allocated X-Page buffers.

The rest of the R module's treatment is identical to the aligned one X-Page scenario previously described herein.

The C module, when receiving the request divides the logical address space to LXAs. For each LXA the C module consults the A2H component to determine the corresponding hash digest; consults the H2D table to determine which D module is responsible for the current LXA; sends each D module a read command containing all the hashes that the respective D module is responsible for. The parameters of the read command include a request ID (as received from the R module); a list of respective hash-pointer pairs; and the identifier of the R module.

Each D module, when receiving the request, acts per hash-pointer pair in the same manner as described above for one X-Page. Aggregated success or error is then sent to the requesting C module.

The C module aggregates all the results given to it by the D modules and return success or error back to the requesting R module, which may then answer the application.

In the case that a read request spans multiple SLs, the R module splits the request and sends several C modules read requests. Each C module may receive one request per SL. The flow may continue as in the simpler case above, except that now the R module aggregates the responses before it answers the application.

Read requests smaller than 4 KB, as well as requests not aligned to 4 KB, may be dealt with at the R module level. For each such parcel of data, the R module may request to read the encompassing X-Page. Upon successful completion of the read command, the R module may crop the non-relevant sections and return only the requested data to the application.

The write flow of one X-Page may consist of one R module which receives the write request from the application, one C module in charge of the address requested and three D modules: $D_{target}$ which is in charge of the X-Page Data to be written (according to its appropriate hash digest), $D_{old}$ which was in charge of the X-Page Data this address contained previously ("old" hash digest), and $D_{backup}$ in charge of storing a backup copy of the X-Page Data to be written.

Figure 8:
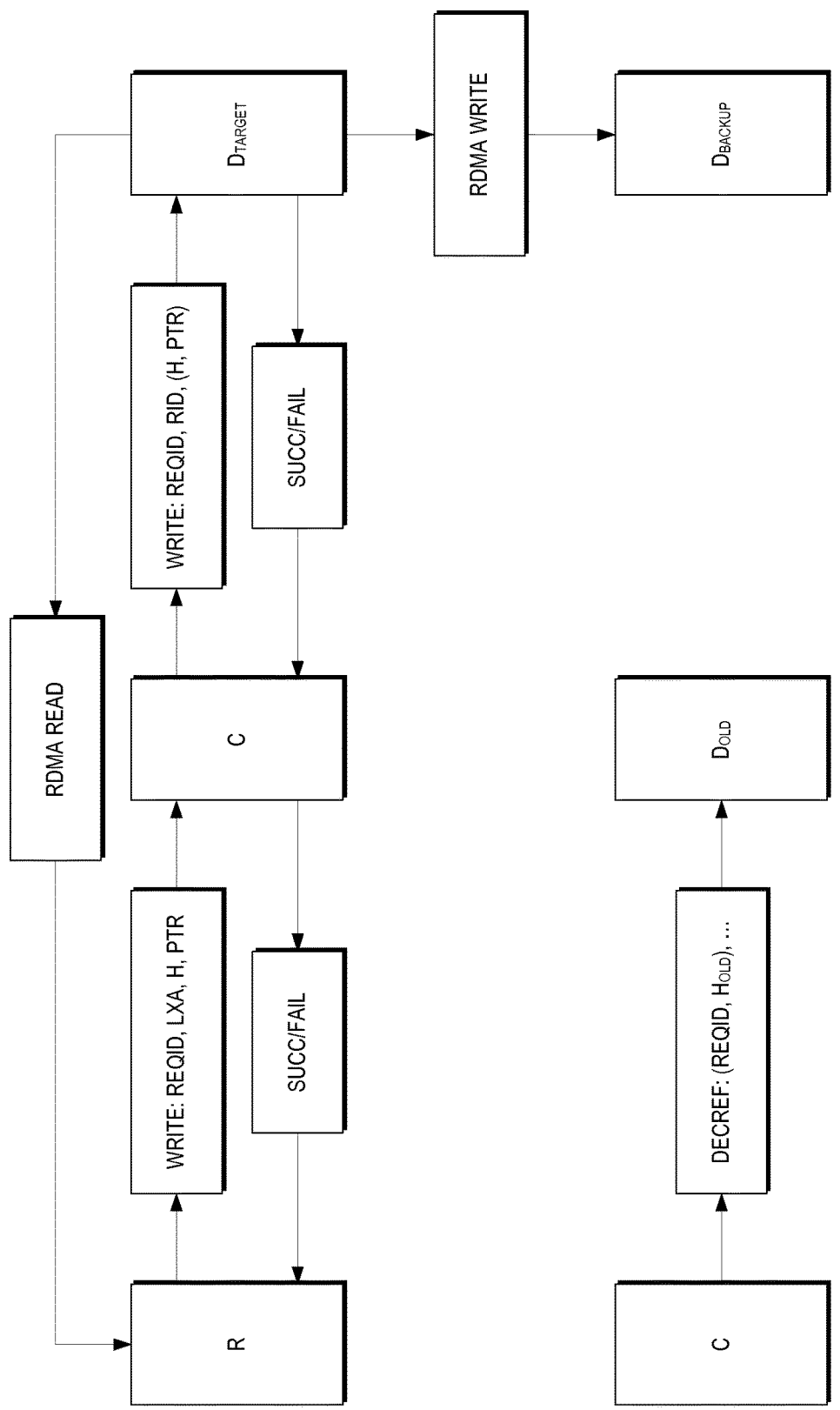
FIG. 8 is a simplified flow diagram illustrating the write procedure for a single aligned X page.

Reference is now made to FIG. 8, which is a simplified flow diagram illustrating the write procedure for a single aligned X page according to the examples described herein.

When an R module receives a write request from the application, the R module allocates a request ID for this operation; translates the LBA to an LXA; computes a hash digest on the data to be written; consults its A→C component to determine which C module is in charge of the current LXA; and sends the designated C module a write command with parameters that include a request ID; an LXA; a hash digest; and a pointer to the buffer containing the data to be written.

The C module, when receiving the request consults its H2D component to understand which D module is in charge of the X-Page to be written ($D_{target}$); and sends $D_{target}$ a write request with parameters that include the request ID (as received from the R module); the hash digest (as received from the R module); the pointer to the data to write (as received from the R module); and the identifier of the R module.

The D module receiving the write command, $D_{target}$, may first check if it already holds an X-Page corresponding to this hash. There are two options here:

First, $D_{target}$ does not have the X-Page. In this case $D_{target}$ fetches the data from the R module using RDMA read and stores it in its memory; consults the H2D component to determine which D module is in charge of storing a backup copy of this X-Page ($D_{backup}$); performs an RDMA write of the X-Page Data to the $D_{backup}$ backup memory space; and returns success (or failure) to the C module.

Second, $D_{target}$ has the X-Page. In this case $D_{target}$ increases the reference count, returns success (or failure) to the C module.

The C module waits for a response from $D_{target}$. If a success is returned, the C module updates the A2H table to indicate that the LXA in question should point to the new hash and returns a response to the requesting R module.

If this is not a new entry in the A2H table, the C module asynchronously sends a decrease reference count command to $D_{old}$ (the D module responsible for the hash digest of the previous X-Page Data). These commands may be aggregated at the C module and sent to the D modules in batches.

The R module may answer the application once it receives a response from the C module.

Figure 9:
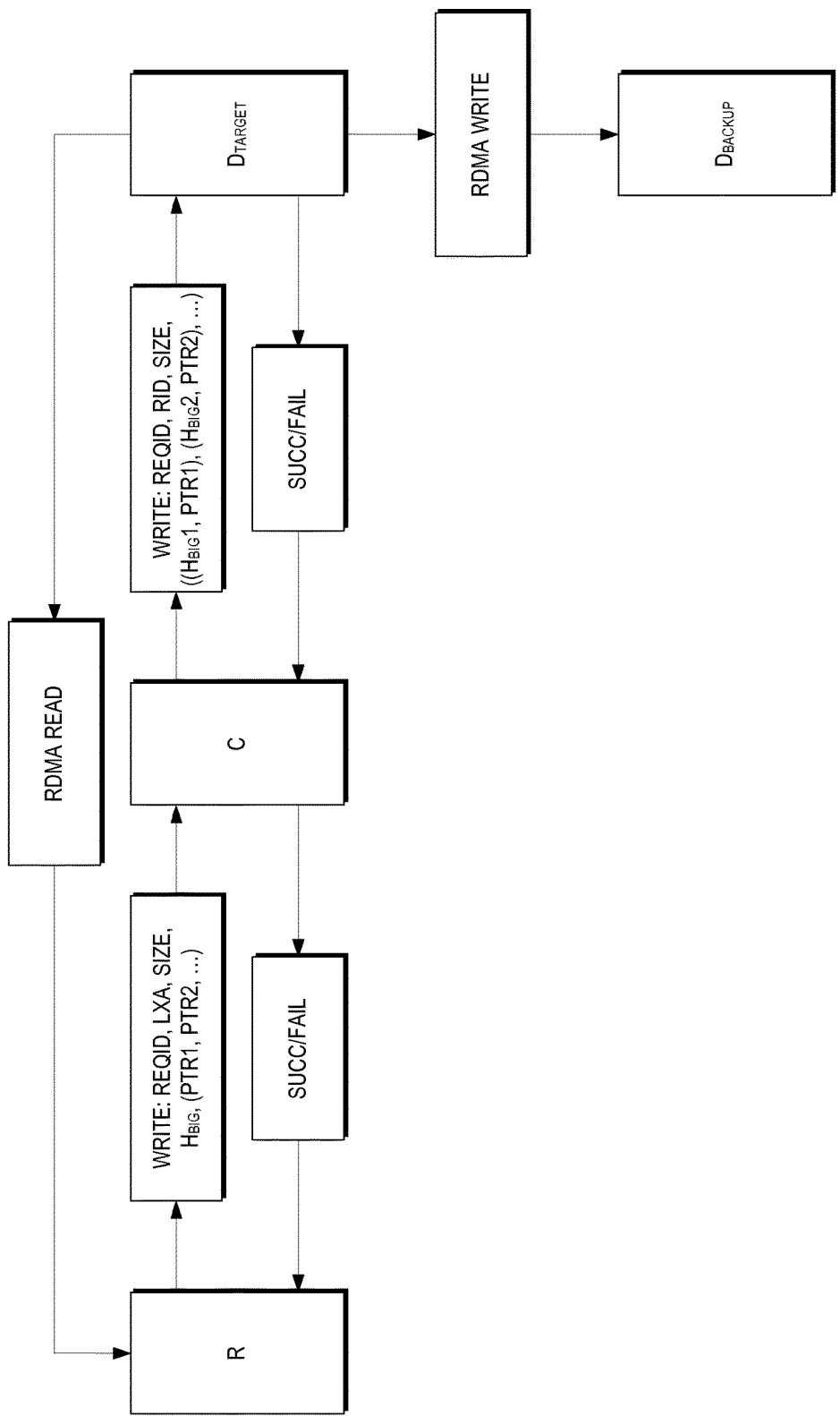
FIG. 9 is a simplified flow diagram illustrating the process for performing write operations to multiple full X-Pages.

Reference is now made to FIG. 9, which is a flow diagram illustrating the process for writes to multiple full X-Pages.

In the case that the write request spans a range of addresses which include more than one X-Page but only one SL, the R module sends the designated C module a write command with parameters that include a request ID; a first LXA; a size of the requested write in LXAs-n; and $H_{BIG}$ which is a unique identifier of the entire chunk of data to be written. $H_{BIG}$ may be a computed hash digest and thus equal for two identical chunks of data.

Additional parameters sent with the write command are n pointers that point to the buffers which hold the data to be written.

The rest of the R module treatment is the same as for the aligned one X-Page scenario.

The C module, when receiving the request, consults its H2D component to understand which D module is in charge of $H_{BIG}$ ($D_{target}$) and generates a hash digest per pointer by replacing one byte of $H_{BIG}$ with the offset of that pointer. It is noted that this byte must not collide with the bytes used by the H2D table distribution.

It may send $D_{target}$ a write request with the parameters that include the request ID (as received from the R module); a list of respective hash-pointer pairs; and the Identifier of the R module.

The D module, when receiving the request, acts per hash-pointer pair in the same manner as described above for one X-Page. Aggregated success or error is then sent to the requesting C module.

The C module waits for a response from $D_{target}$. If the response indicates success, the C module updates its A2H table to indicate that the LXAs in question should point to the new hashes. Updating of entries in the A2H table may be done as an atomic operation, to ensure the write request is atomic. Note that all requests aligned to 4 KB (or another predefined block size) that fall within a SL may be atomic. The C module returns a response to the requesting R module. The C module adds the list of old hashes to the "decrease reference" batch if needed.

The R module answers the application once it receives a response from the C module.

In the case in which a write request spans multiple SLs, the R module splits the request and sends smaller write requests to several C modules. Each C module receives one request per SL (with a unique request ID). The flow continues as in the simpler case above, except that now the R module aggregates the responses before it answers the application.

Multi-Tier all-Flash Array

As described above, example embodiments of the present invention perform inline deduplication which is memory intensive. For example, inline deduplication requires maintaining the A2H table (also referred to below as the A2H table) in memory storing the mapping of different addresses to hash values. Further, it should be understood that while example embodiments described above rely on an A2H mapping having a 4 KB granularity, other granularities may be used, such as 8 KB or, as described below, even 2 MB. In other words, depending on a particular configuration of example embodiments of the present invention, various chunk sizes of a storage volume (e.g., 4 KB, 8 KB, 2 MB) that map to a continuous SCSI address range may have an entry in the A2H table.

As storage arrays according to example embodiments of the present invention are scale-out in terms of both performance and capacity, growth of an H2P table, which is ordered by hash and maps to physical data locations on disk (e.g., SSDs), is more or less linear with storage capacity. However, the sparsely populated A2H table is kept per volume and maintained in the finite amount of available memory and its growth is linear with the configured storage which must account for, for example, overprovisioning and deduplication.

Therefore, traditional flash storage arrays are limited by the size of the A2H which, in turn, is limited by the amount of memory. However, typically the memory to storage ratio is relatively high which limits the storage capacity of the storage array to, for example, 40 TB of physical space. Therefore, it would be advantageous to provide a higher-capacity storage array without a linear increase of a memory footprint.

Accordingly, example embodiments of the present invention implement capacity-level tiering by adding a second tier to the storage array (e.g., a cheaper, denser flash tier). As part of the tiering scheme, the meta-data for the second tier is also stored and managed more economically, thus reducing the overall requirements for meta-data storage space on the storage array. It should be understood that, in example embodiments of the present invention, tiering may be performed not only according to traditional means (e.g., maintaining hot (i.e., frequently accessed) data in the fast tier and tiering cold (i.e., infrequently accessed) data to the capacity tier) but also according to how frequently blocks are overwritten and how sparse address ranges are. To achieve this goal, as will be described in greater detail below, example embodiments of the present invention decrease the granularity (i.e., increase the chunk size) of the A2H table to, for example, 2 MB per address.

Figure 10A:
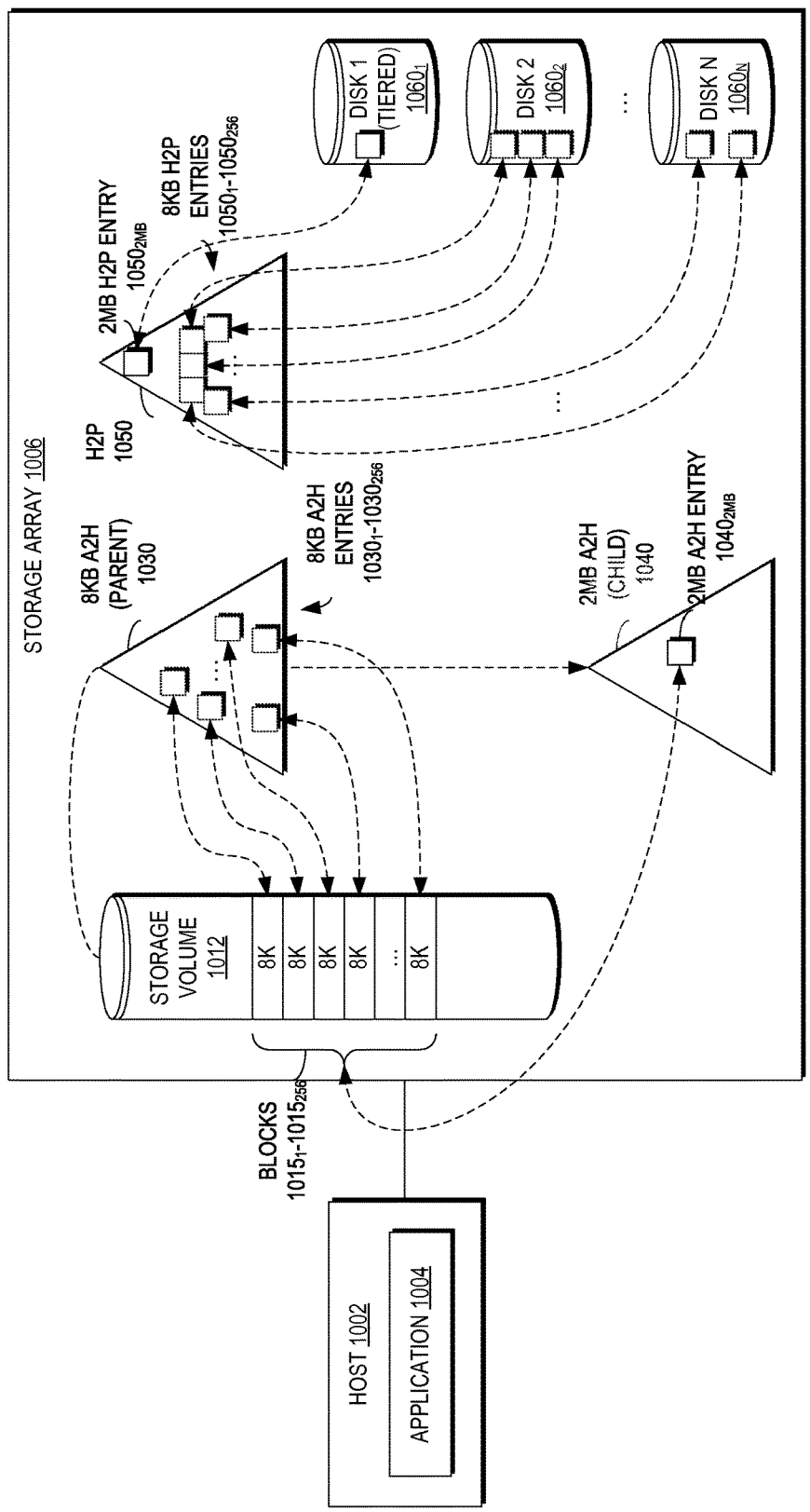
FIG. 10A is a block diagram illustrating a tiered storage array according to an example embodiment of the present invention.
Figure 11:
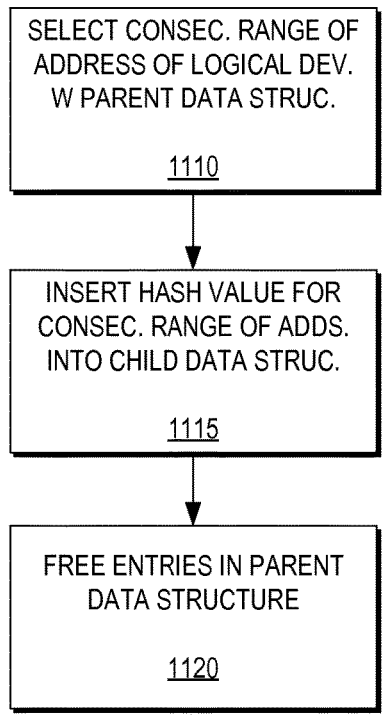
FIG. 11 is a flow diagram illustrating a method for tiering metadata in a tiered storage array according to an example embodiment of the present invention.

FIG. 10A is a block diagram illustrating a tiered storage array according to an example embodiment of the present invention. FIG. 11 is a flow diagram illustrating a method for tiering metadata in a tiered storage array according to an example embodiment of the present invention. FIGS. 10A and 11 may be described in conjunction.

As illustrated in FIG. 10A, the storage array 1006 may present one or more storage volumes 1012 to a host 1002 hosting an application 1004. In this example embodiment, the storage volume is divided into chunks/blocks of 8 kilobytes (K) $1015_1$-$1015_{256}$ (1015 generally), with each chunk 1015 mapped to a respective A2H entry $1030_1$-$1030_{256}$ in a sparsely populated A2H table 1030. Further, as described above, the hash values from the A2H table 1030 may be used as keys into the H2P table 1050 to respective H2P entries $1050_1$-$1050_{256}$ to identify data storage location on respective disks $1060_1$-$1060_N$.

The storage array 1006 may determine that the volume 1012 should be tiered, such as via FAST® by EMC Corporation of Hopkinton, Mass. and as described in U.S. Pat. No. 6,314,503 entitled "METHOD AND APPARATUS FOR MANAGING THE PLACEMENT OF DATA IN A STORAGE SYSTEM TO ACHIEVE INCREASED SYSTEM PERFORMANCE" and assigned to EMC Corporation of Hopkinton, Mass., the teachings of which are incorporated herein by reference in their entirety. According to an example embodiment of the present invention, the granularity of the lower tier should be coarser (e.g., 2 MB) than the granularity of the higher tier (e.g., 8 KB) and data moved from the high tier to the lower tier will be erased from the higher tier, thereby reducing the memory footprint of the higher tier. Therefore, the data structure A2H meta-data table in the lower tier will require 1/256 of the meta data in the higher tier. In certain embodiments, the storage array 1006 may leverage a snapshot creation capability to create the lower-tier data structure as a child of the parent higher tier data structure.

Accordingly, as illustrated in FIGS. 10A and 11, the storage array 1006 may select a consecutive range of addresses $1015_1$-$1015_{256}$ of the storage volume 1012 (i.e., a logical device) to be tiered to the lower storage tier and have metadata from a parent data structure 1030 tiered to a coarser metadata tier (1110). The storage array 1006 then may take a hash value over the consecutive range of addresses $1015_1$-$1015_{256}$ of the logical device 1012 and insert the hash value as an A2H entry $1040_{2\,MB}$ at a coarser granularity into a child data structure 1040 (1115).

The storage array 1006 may free entries $1030_1$-$1030_{256}$ in the parent A2H 1030 for the consecutive range of addresses $1015_1$-$1015_{256}$, (1120) in favor of the hash value $1040_{2\,MB}$ at the second granularity for the consecutive range of addresses $1015_1$-$1015_{256}$ inserted into the child data structure 1040 (i.e., the 8 KB A2H entries $1030_1$-$1030_{256}$ may be deleted from the 8 KB A2H table 1030 as indicated by the dotted lines). Therefore, the storage array 1006 may maintain metadata in memory for the storage volume 1012 according to the parent A2H 1030 maintaining the first set of hash values at the first granularity (i.e., 8 KB) of the storage volume 1012 (it should be understood that other A2H entries may exist in the parent A2H 1030 for other blocks 1015 of the storage volume 1012) and according to the child A2H 1040 into which was inserted the A2H entry $1040_{2\,MB}$ at the second granularity (i.e., 2 MB) of the storage volume 1012.

The H2P table 1050 is also updated to reflect the tiered location of the 2 MB tiered consecutive range of addresses $1015_1$-$1015_{256}$. Therefore, a new entry $1050_{2\,MB}$ for the 2 MB tiered consecutive range of addresses $1015_1$-$1015_{256}$ may be created in the H2P 1050 reflecting the tiered location of the 2 MB tiered data on disk 1060, with the old H2P entries consecutive range of addresses $1050_1$-$1050_{256}$ for the consecutive range of addresses $1015_1$-$1015_{256}$ deleted from the H2P table 1050 as indicated by the dotted lines.

Figures 12, 13:
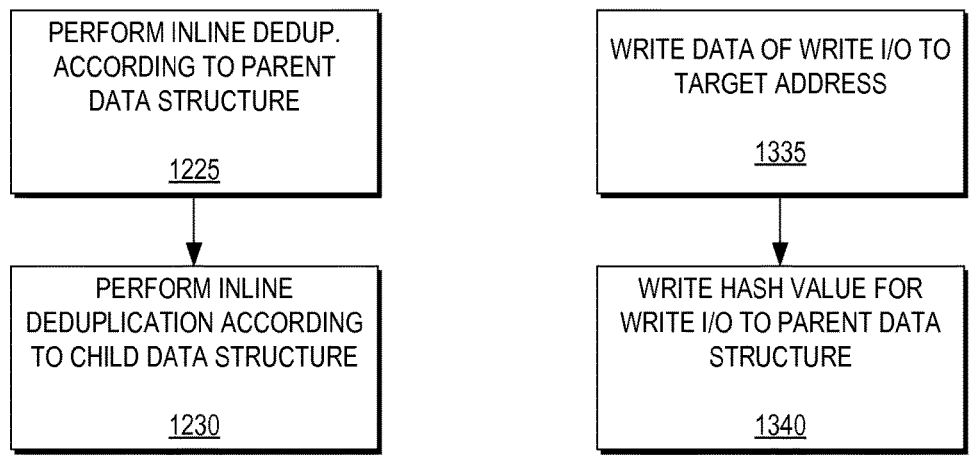
FIG. 12 is a flow diagram illustrating a method for performing inline deduplication in a tiered storage array according to an example embodiment of the present invention.
FIG. 13 is a flow diagram illustrating a method for performing a write I/O in a tiered storage array according to an example embodiment of the present invention.

FIG. 12 is a flow diagram illustrating a method for performing inline deduplication in a tiered storage array 1006 according to an example embodiment of the present invention. As illustrated in FIGS. 10A and 12, the storage array 1006 then may perform inline deduplication over the storage volume 1012 at both the first granularity (e.g., 8 KB) and at the second granularity (e.g., 2 MB). In other words, the storage array 1006 may perform inline deduplication over the first tier of storage according to the parent A2H table 1030 (1225) and may perform inline deduplication over the second tier of storage according to the child A2H table 1040 (1230). In other embodiments, data in the lower tier may be compressed. As will be described in greater detail below, the storage array 1006 may serve I/Os to the storage volume 1012 according to the parent A2H 1030 at the first granularity (e.g., 8 KB) and according to the child A2H 1040 at the second granularity (e.g., 2 MB).

FIG. 10B is a block diagram illustrating performing a write I/O 1010B in a tiered storage array 1006 according to an example embodiment of the present invention. FIG. 13 is a flow diagram illustrating a method for performing a write I/O 1010B in a tiered storage array 1006 according to an example embodiment of the present invention. FIGS. 10B and 13 may be described in conjunction. As illustrated in FIG. 10B, the host 1002 may submit a write I/O 1010B to the storage array 1006 with data being written to the storage volume 1012 at its target address 1017 as described above (1335) and metadata (i.e., a hash value) $1030_{8\ KB}$, $10508_{KB}$ being written to the parent A2H 1030 and to the H2P 1050 as described above (1340).

Figure 14:
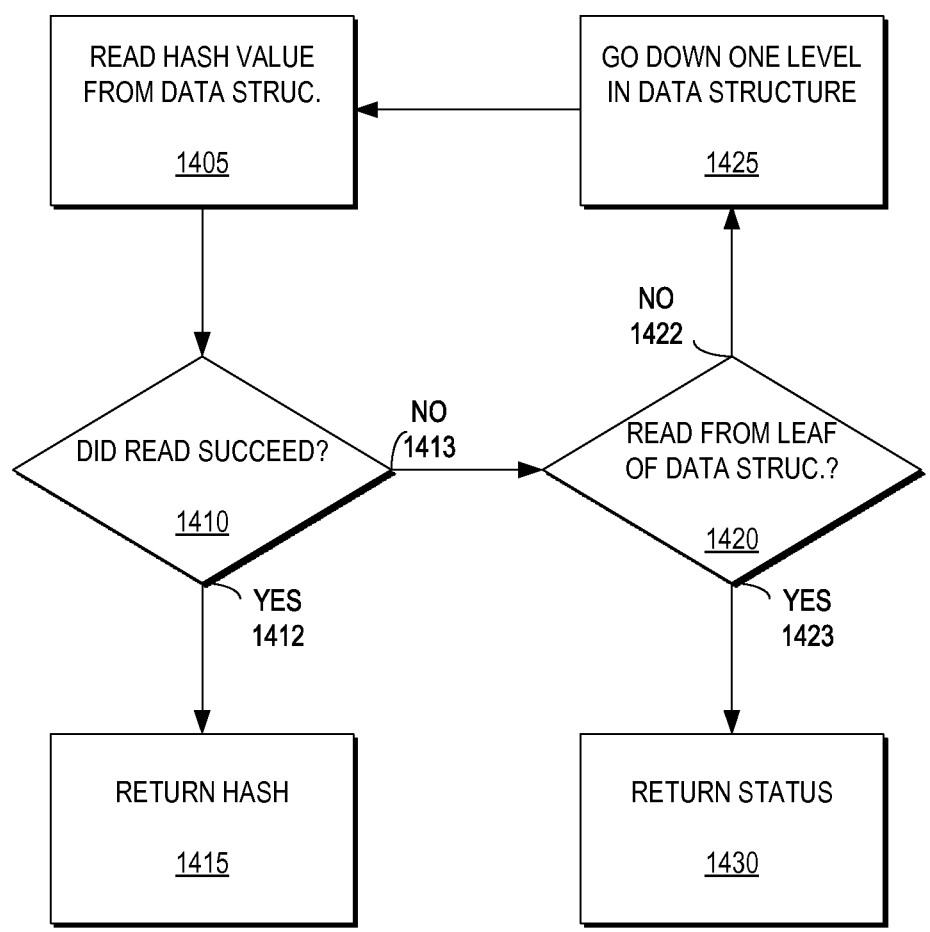
FIG. 14 is a flow diagram illustrating a method for performing a read I/O in a tiered storage array according to an example embodiment of the present invention.

FIG. 10C is a block diagram illustrating performing a read I/O 1010C in a tiered storage array 1006 according to an example embodiment of the present invention. FIG. 14 is a flow diagram illustrating a method for performing a read I/O 1010C in a tiered storage array 1006 according to an example embodiment of the present invention. FIGS. 10C and 14 may be described in conjunction. As illustrated in FIG. 10C, the host 1002 may submit a read I/O 1010C to the storage array 1006 to read the data written to the storage volume 1012 in FIG. 10B.

The storage array 1006 may attempt to read a hash value $1030_{8\ KB}$ associated with the address 1017 from the parent A2H 1030 at the first granularity (e.g., 8 KB) (1405). The method then determines whether the read succeeded (1410). If the read I/O 1010C succeeds (1412), the storage array returns the hash (1415) and uses the hash as described above, in conjunction with the H2P 1050 to locate the data on disk 1060. Here, the read will succeed because the I/O 1010C was for data in the first tier having metadata in the parent A2H 1030.

However, if the read I/O 1010C was for the A2H entry $1040_{2\ MB}$ at the coarser granularity tiered to the lower storage tier with reference to FIG. 10A, then the read from the parent A2H 1030 will not succeed (1413). Therefore, the storage array 1006 determines whether the read was performed on a leaf data structure (i.e., from a child A2H table having no descendants). Here, in this example, the read was performed on the parent (i.e., root) A2H table 1030 having the child A2H table 1040 and therefore not from a leaf of the metadata data structure (1422). The storage array 1006 then may traverse down one level in the data structure (1425) (here, to the child A2H table 1040). The storage array 1006 then may attempt to read the hash value from the child A2H table 1040 (1405). Here, in this example, the read will succeed (1412) because the I/O 1010C was for data in the second tier having metadata in the child A2H 1040.

It should be understood that the method of FIG. 14 may continue recursively until the storage array successfully reads a hash (1412) and returns the hash (1415) or reaches a leaf A2H table (1423) and returns a status (1430) (e.g., a zero or some other value indicating that the requested data does not exist).

Figure 15:
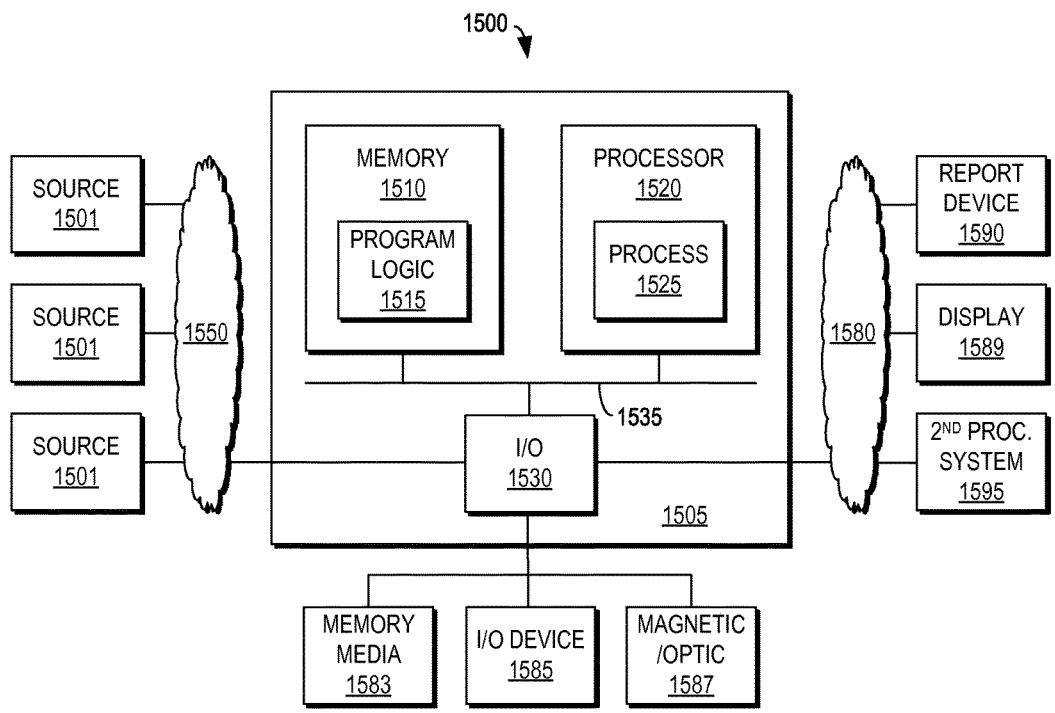
FIG. 15 is a block diagram illustrating an apparatus according to an example embodiment of the present invention.

FIG. 15 is a block diagram of an example embodiment apparatus 1505 according to the present invention. The apparatus 1505 may be part of a system 1500 and includes memory 1510 storing program logic 1515, a processor 1520 for executing a process 1525, and a communications I/O interface 1530, connected via a bus 1535.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 15, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 16:
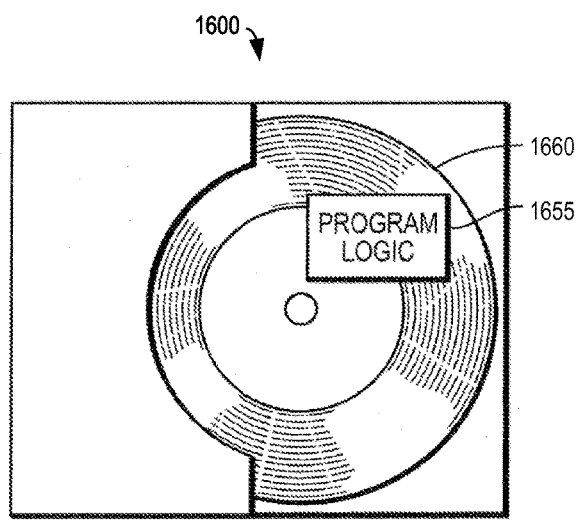
FIG. 16 is an illustration of an example embodiment of the present invention embodied in computer program code.

FIG. 16 is a block diagram of a computer program product 1600 including program logic 1655, encoded on a computer-readable medium 1660 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:

selecting a consecutive range of addresses of a logical device having a parent data structure associated therewith maintaining a first set of hash values comprising and corresponding to addresses of memory at a first granularity of the logical device, wherein the first set of hash values is generated from contents of the consecutive range of address;

inserting into a child data structure associated with the parent data structure a second hash value calculated over the consecutive range of addresses of the logical device comprising and corresponding to addresses of memory at a second granularity of the logical device, wherein the child data structure requires less storage space than the parent data structure; and freeing entries in the parent data structure at the first granularity for the consecutive range of addresses, in favor of the second hash value at the second granularity for the consecutive range of addresses inserted into the child data structure, for storing hash values for other addresses of the logical device.

2. The method of claim 1 further comprising maintaining metadata in memory for the logical device according to the parent data structure maintaining the first set of hash values at the first granularity of the logical device and according to the child data structure into which was inserted the second hash value at the second granularity of the logical device.

3. The method of claim 2 further comprising performing inline deduplication over the logical device at both the first granularity and the second granularity.

4. The method of claim 3 wherein performing inline deduplication over the logical device at both the first granularity and the second granularity comprises:
   performing a first inline deduplication of a first portion of the logical device according to the first set of hash values for the logical device in the parent data structure at the first granularity; and
   performing a second inline deduplication of a second portion of the logical device according to the second hash value for the logical device in the child data structure at the second granularity.

5. The method of claim 1 further comprising serving Input/Output (I/O) to the logical device according to the parent data structure at the first granularity and according to the child data structure at the second granularity.

6. The method of claim 5 wherein serving Input/Output (I/O) to the logical device according to the parent data structure at the first granularity and according to the child data structure at the second granularity comprises, for a write I/O to the logical device:
   writing data of the write I/O to its target address; and
   writing a hash value for the write I/O to the parent data structure associated with the logical device.

7. The method of claim 5 wherein serving Input/Output (I/O) to the logical device according to the parent data structure at the first granularity and according to the child data structure at the second granularity comprises, for a read I/O to an address of the logical device:
   attempting a first read of a hash value associated with the address from the parent data structure at the first granularity;
   if the first read succeeds, returning the read hash value from the parent data structure at the first granularity;
   if the first read fails, attempting a second read of the hash value associated with the address from the child data structure at the second granularity;
   if the second read succeeds, returning the read hash value from the child data structure at the second granularity; and
   if the second read fails, return a status.

8. The method of claim 7 further comprising using the read hash value as an index into a third data structure to identify a location of data satisfying the I/O on physical disks.

9. The method of claim 1 wherein selecting a consecutive range of addresses of a logical device having a parent data structure associated therewith maintaining a first set of hash values at a first granularity of the logical device comprises selecting the consecutive range of addresses according to a heat map identifying a frequency of access for each address.

10. The method of claim 9 further comprising tiering storage of the logical device by migrating data associated with the consecutive range of addresses from a first storage tier to a second storage tier.

11. A system comprising:
   a processor;
   a storage array;
   a logical device stored on one or more storage devices on the storage array; and
   computer program code that when executed on the processor performs the operations of:
   selecting a consecutive range of addresses of the logical device having a parent data structure associated therewith maintaining a first set of hash values comprising and corresponding to addresses of memory at a first granularity of the logical device, wherein the first set of hash values is generated from contents of the consecutive range of address;
   inserting into a child data structure associated with the parent data structure a second hash value calculated over the consecutive range of addresses comprising and corresponding to addresses of memory of the logical device at a second granularity of the logical device; and
   freeing entries in the parent data structure at the first granularity for the consecutive range of addresses, in favor of the second hash value at the second granularity for the consecutive range of addresses inserted into the child data structure, for storing hash values for other addresses of the logical device, wherein the child data structure requires less storage space than the parent data structure.

12. The system of claim 11 further comprising maintaining metadata in memory for the logical device according to the parent data structure maintaining the first set of hash values at the first granularity of the logical device and according to the child data structure into which was inserted the second hash value at the second granularity of the logical device.

13. The system of claim 12 further comprising performing inline deduplication over the logical device at both the first granularity and the second granularity.

14. The system of claim 13 wherein performing inline deduplication over the logical device at both the first granularity and the second granularity comprises:
   performing a first inline deduplication of a first portion of the logical device according to the first set of hash values for the logical device in the parent data structure at the first granularity; and
   performing a second inline deduplication of a second portion of the logical device according to the second hash value for the logical device in the child data structure at the second granularity.

15. The system of claim 11 further comprising serving Input/Output (I/O) to the logical device according to the parent data structure at the first granularity and according to the child data structure at the second granularity.

16. The system of claim 15 wherein serving Input/Output (I/O) to the logical device according to the parent data structure at the first granularity and according to the child data structure at the second granularity comprises, for a write I/O to the logical device:
   writing data of the write I/O to its target address; and
   writing a hash value for the write I/O to the parent data structure associated with the logical device.

17. The system of claim 15 wherein serving Input/Output (I/O) to the logical device according to the parent data structure at the first granularity and according to the child data structure at the second granularity comprises, for a read I/O to an address of the logical device:

attempting a first read of a hash value associated with the address from the child data structure at the second granularity;

if the first read succeeds, returning the read hash value from the child data structure at the second granularity;

if the first read fails, attempting a second read of the hash value associated with the address from the parent data structure at the first granularity;

if the second read succeeds, returning the read hash value from the parent data structure at the first granularity; and if the second read fails, failing the read I/O.

18. The system of claim 17 further comprising using the read hash value as an index into a third data structure to identify a location of data satisfying the I/O on physical disks.

19. The system of claim 11 wherein selecting a consecutive range of addresses of a logical device having a parent data structure associated therewith maintaining a first set of hash values at a first granularity of the logical device comprises selecting the consecutive range of addresses according to a heat map identifying a frequency of access for each address.

20. The system of claim 19 further comprising tiering storage of the logical device by migrating data associated with the consecutive range of addresses from a first storage tier to a second storage tier.

21. A computer program product having computer executable code embodied in non-transitory storage media comprising:

computer program code for selecting a consecutive range of addresses of a logical device having a parent data structure associated therewith maintaining a first set of hash values comprising and corresponding to addresses of memory at a first granularity of the logical device, wherein the first set of hash values is generated from contents of the consecutive range of address;

computer program code for inserting into a child data structure associated with the parent data structure a second hash value calculated over the consecutive range of addresses comprising and corresponding to addresses of memory of the logical device at a second granularity of the logical device; and computer program code for freeing entries in the parent data structure at the first granularity for the consecutive range of addresses, in favor of the second hash value at the second granularity for the consecutive range of addresses inserted into the child data structure, for storing hash values for other addresses of the logical device, wherein the child data structure requires less storage space than the parent data structure.

* * * * *